United States Patent [19]

Cibie

[11] 4,432,039
[45] Feb. 14, 1984

[54] LIGHT TRANSMITTING SYSTEM FOR AUTOMOBILE HEADLAMP

[75] Inventor: Pierre Cibie, Bobigny, France

[73] Assignee: Cibie Projecteurs, Bobigny, France

[21] Appl. No.: 428,951

[22] Filed: Sep. 30, 1982

[30] Foreign Application Priority Data

Oct. 5, 1981 [FR] France .............................. 81 18679

[51] Int. Cl.³ .............................................. F21V 7/04
[52] U.S. Cl. ........................................ 362/31; 362/32; 362/307; 362/310; 362/328; 362/330; 362/350; 362/83
[58] Field of Search ................... 362/31, 32, 307, 310, 362/328, 330, 350, 83

[56] References Cited

U.S. PATENT DOCUMENTS 4,249,231 2/1981 Decaux ................................ 362/31

*Primary Examiner*—Stephen J. Lechert, Jr.

*Attorney, Agent, or Firm*—Robert W. Fiddler

[57] ABSTRACT

A light transmitting system for an automobile headlamp having a real light source, means for a light channel and an elliptical reflector for concentrating the radiation from this source on the end of the light channel provided with a plurality of reflecting facets. The light channel is formed by a single transparent bar arranged horizontally and transversely with reference to the direction of illumination. The front of the bar is formed as a vertical light output face and the rear of the bar has a series of vertical steps defining a series of oblique vertical reflecting facets thus constituting as many virtual light sources. These facets are arranged in optical co-operation with lenses having axes parallel to the direction of illumination so that these lenses project images corresponding to the facets in the direction of illumination in order to form an assembly of elementary light beams merging into one single beam.

8 Claims, 6 Drawing Figures

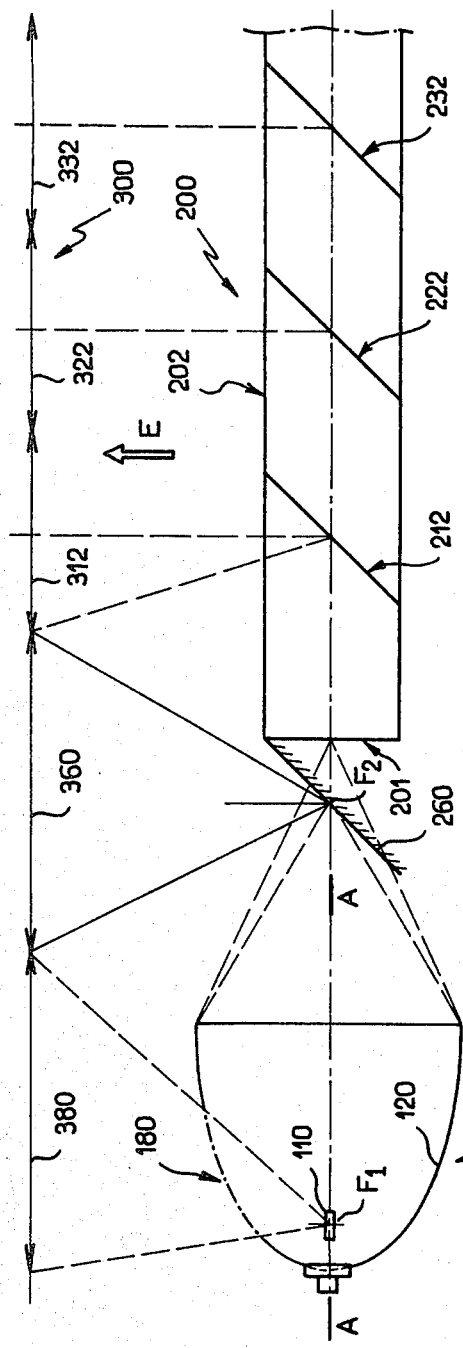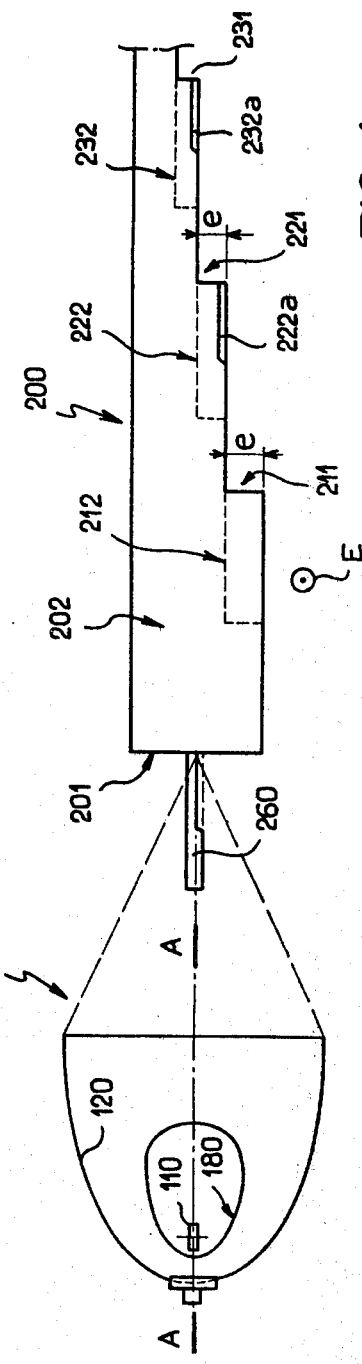

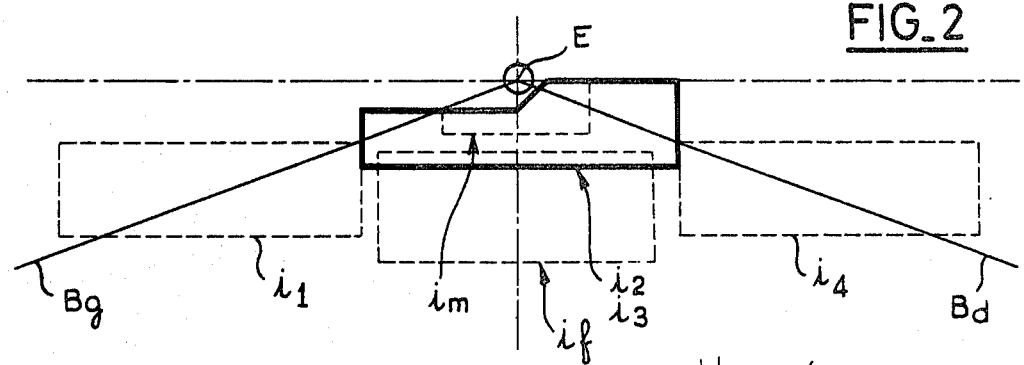
FIG_2
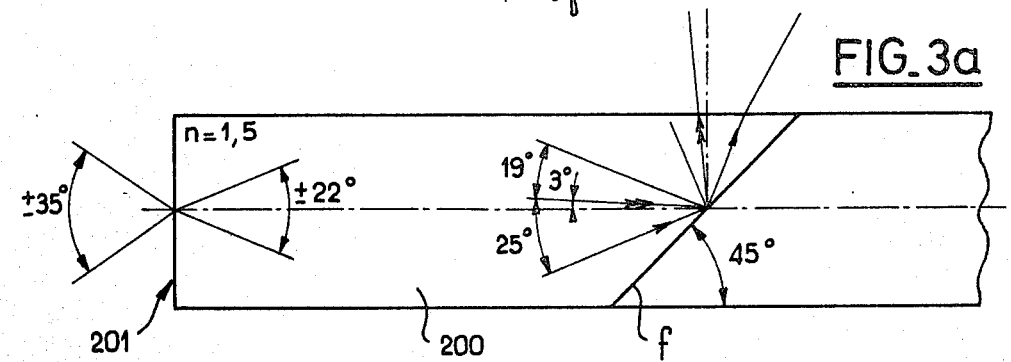
FIG_3a
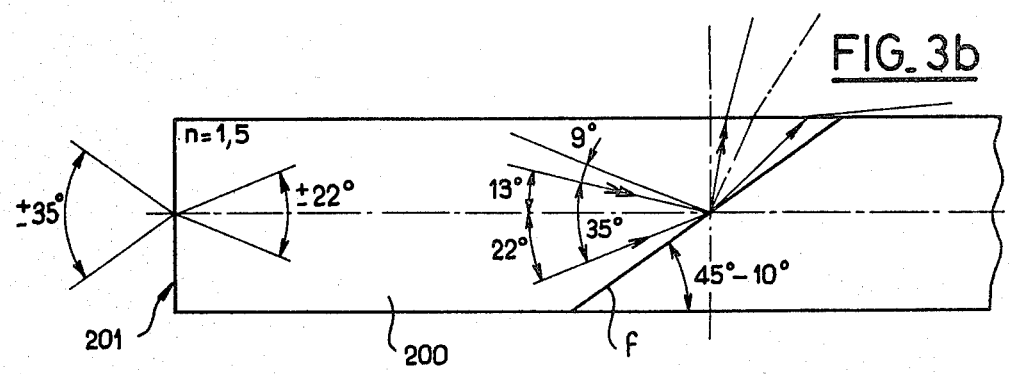
FIG_3b
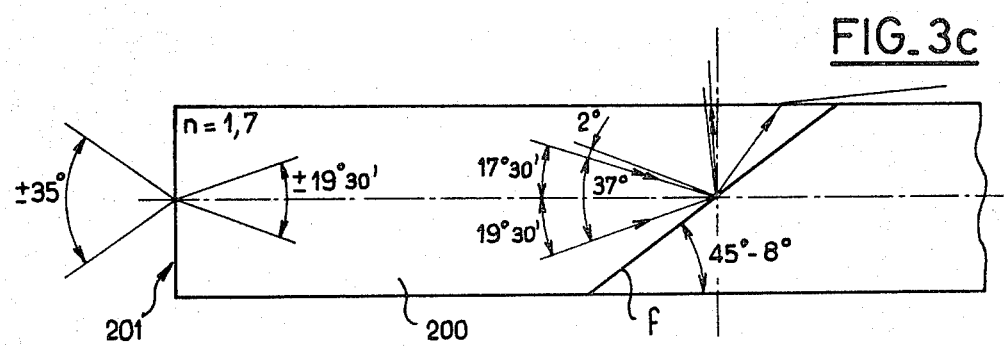
FIG_3c

LIGHT TRANSMITTING SYSTEM FOR AUTOMOBILE HEADLAMP

BACKGROUND OF THE INVENTION

The present invention relates to headlamps for automobiles.

More particularly, the invention relates to the light transmitting systems of headlamps of the type described in British patent application No. 80.40822 in the name of the present applicants and published under No. 2,066,444.

This type of headlamp incorporates a real light source, means for concentrating the radiation from this source on the end of a light channel provided with a plurality of reflecting facets constituting as many virtual light sources and co-operating with a plurality of corresponding dioptric elements in order to form an assembly of elementary light beams merging to one single beam giving the desired illumination. Such a headlamp is more particularly described with reference to FIG. 4 of the aforementioned patent.

SUMMARY OF THE INVENTION

The applicants have now discovered as a result of later tests that certain structures and particular arrangements are particularly well adapted to the production of a headlamp for an automobile, both from the point of view of the space required and the optimum topological arrangement of its component parts in an automobile, and from the point of view of optimising the beam obtained, especially when this is a cut-off beam, and particularly a dipped beam.

According to the invention, a light transmitting system for an automobile headlamp comprises a real light source a light channel, means for concentrating flux from said source onto one end of said light channel, and a series of lenses, said light channel being formed by a single transparent bar arranged horizontally and transversely with reference to the direction of illumination, the front of said bar being formed by a vertical light output face and the rear of said bar having a series of vertical steps defining a series of oblique vertical reflecting faces constituting as many virtual light sources and being arranged in optical co-operation with said lenses, said lenses having axes which are parallel to the direction of illumination so that said lenses project images corresponding to said facets in said direction of illumination in order to form an assembly of elementary light beams merging into one single beam.

Preferably, the bar has the general shape of a rectangular parallelepiped with a succession of regular steps of substantially equal height, and said facets are substantially oriented at 45° with reference to said direction of illumination and are of substantially equal dimensions.

Preferably, the initial section of the bar is a square section and extends at right angles to the direction of illumination. Its reflecting facets are preferably identical in dimensions and orientation and are stepped over the entire length of the bar, corresponding to the steps which are arranged regularly over the height of the bar. Thus, in the case of n steps, and n vertical facets arranged obliquely at 45° with reference to the general direction of the bar, each facet may give by reflection a rectangular elementary image, the width of which is equal to the side of the input square and the height of which is equal to one nth of this same square.

If a cut-off beam is to be obtained, for each elementary beam one part of the front output face of the bar or of each rear facet may be masked corresponding to the desired form of the cut-off. For cutting off a dipped beam, as defined by regulations currently in force, one or more asymmetric covers may be arranged either on the front face of the bar or on each of the facets. The bar may also be cut in such a way that the facets have a profile corresponding to the desired cut-off shape.

The means for concentrating luminous flux at the input of the bar preferably comprises an elliptical mirror having an inner focus and an outer focus preferably arranged on the axis of the bar. The real light source is preferably located at the inner focus, and the end of the bar is preferably near the outer focus.

A vertical plane mirror inclined at 45° and extending over a limited height may be arranged at the input of the bar in order to intercept a part of the front luminous flux in a zone near the axis of the elliptical mirror where there is consequently a strong concentration of the flux. Like the facets of the bar, this mirror preferably co-operates with an appropriate lens.

Furthermore, a part of the luminous flux emitted by the source may be used directly without reflection on the elliptical mirror by providing this mirror with an aperture for direct illumination co-operating with a lens in such a way as to form the image from the light source directly. The facets of the bar are preferably inclined at an angle of 45° and operate in total reflection. However, the facets could be given inclinations other than 45° in order to increase the effect of total reflection. A reflective coating could also be applied to the facets.

BRIEF DESCRIPTION OF THE DRAWINGS

The invention may be carried into practice in various ways and some embodiments will now be described by way of example with reference to the accompanying drawings in which:

FIG. 1a and 1b are a schematic front elevation view and bottom plan view of the light and lens system of a headlamp according to the present invention.

FIG. 2 shows the projection, on a standard screen at 25 meters, of a dipped beam obtained with such a headlamp, and FIGS. 3a, 3b and 3c show schematically, three embodiments of facets for total reflection in the light bar of such a headlamp.

DESCRIPTION OF THE PREFERRED EMBODIMENTS.

A preferred embodiment of the headlamp according to the invention is shown in FIGS. 1a and 1b. Essentially it contains three functional assemblies which are the light flux concentrating assembly 100; transparent bar 200; and an assembly of lenses 300 (this latter assembly is not shown in FIG. 1a for reasons of clarity).

The assembly for concentrating the flux 100, arranged in the axis of the bar, 200, consists essentially of a light source 110 and a reflector or elliptical mirror 120 the two foci of which are designated $F_1$ for the inner focus and $F_2$ for the outer focus. The light source 110 consists of the filament of an automobile light bulb, preferably arranged in the axis A—A of the elliptical reflector 120. The luminous flux emitted by the source 110 is reflected by the reflector 120 as an assembly of rays which converge towards the focal zone near $F_2$. Towards the front of the headlamp, the reflector 120 is provided with an opening 180 which constitutes a light aperture which permits the rays emitted from the source 110 to pass directly.

The transparent bar 200 extends along the axis of the elliptical mirror 120. It is made from glass or any other similar transparent material which has, as will be seen below, as high a refractive index as possible. Its input face 201, which receives at its surface the luminous flux reflected by the mirror 120, is of square section. Its front face 202 is vertical and extends at right angles to the direction of illumination indicated by the arrow E.

On its rear part, the bar 200 has a succession of steps of equal height e, each defined by a horizontal face (211, 221, 231 . . . ) and a vertical facet (212, 222, 232, . . . ) inclined at 45° to the direction of illumination E. A small vertical plane mirror 260 is arranged immediately in the light path before the input face 201, is inclined at 45° and is limited to the horizontal zone near the axis A-A. Thus, the mirror 260 is arranged to intercept a part of the flux reflected by the reflector 120 in its zone of strongest concentration.

An assembly of convergent lenses 300, the axis of which are substantially parallel to the direction of emission E, extends in front of the optical system defined above. The lenses 312, 322, 332 . . . are arranged in optical co-operation with the facets 212, 222, 232, . . . which are substantially at the focus of the lenses.

In the same way, one convergent lens 360 is arranged in optical co-operation with the small mirror 260 which is substantially at the focus of this lens. Also, one convergent lens 380 is arranged facing an aperture 180 in the reflector 120 in optical co-operation with the source 110 which is substantially at the focus thereof.

With such an arrangement, the formation of a light beam is as follows. The flux emitted by the source 110 and reflected by the mirror 120 penetrates the bar 200 through its input face 201 and is there totally reflected by the facets 212, 222, 232, . . . . The reflected elementary beams are picked up by the lenses 312, 322, 332, . . . which project the corresponding light beams towards the front of the headlamp. In the same way, the flux intercepted by the mirror 260 is picked up by the lens 360 and the direct luminous flux passing through the aperture 180 is picked up by the lens 380.

The assembly of lenses 312, 322, 332, . . . 360, 380 can be produced in the form of an assembly unit forming the front glass of the headlamp. This glass is not necessarily planar and perpendicular to the direction E. It can be oblique, the different lenses being stepped, for example in order to permit the use of a glass which is entirely oblique with reference to the axis of illumination E (which would coincide with the longitudinal axis of the vehicle).

When projecting a beam, each total reflection facet such as 212, 222, 232, . . . thus provides on a screen, through the corresponding lens (312, 322, 332, . . . ) an image corresponding to the input flux received by the facet and projected according to the direction E, the virtual image given by each facet having, in the example shown in FIGS. 1a and 1b, a width equal to the side of the input face 201 and a height e. In the same way, the mirror 260 gives rise through the lens 360 to the projection of an image corresponding to the dimensions of the mirror seen in the direction E. Finally, the aperture 180 projects an image corresponding to the dimensions of the aperture 180.

With such an arrangement the different elementary beams merge into one single emitted beam and that as a result of careful arrangement of the axes of the lenses which are staggered (in translation) with reference to the axes of the elementary beams which they intercept, it is possible to achieve any arrangement of illumination for complete illumination suitable for automobiles. Thus, the images projected corresponding to the different facets 312, 322, 332, . . . can be superimposed or juxtaposed, as can the images originating from the aperture 180 and the mirror 260 in the same way.

The production of a staggered cut-off beam, according to the regulations currently in force, will now be described in the following typical example as illustrated in FIG. 2. In order to facilitate understanding, the images projected on a screen at 25 meters originating from the facets 212, 222, 232, 242, . . . are designated by $i_1$, $i_2$, $i_3$, $i_4$, . . ., the image corresponding to the mirror 260 is designated by $i_m$ and the image corresponding to the aperture 180 is designated by $i_f$.

FIG. 2 shows in the usual manner a projection screen at 25 meters on which automobile lights are regulated in the standard way. As shown in FIG. 1a, for a cut-off beam the mirror 260 is provided with a cut-off profile in two staggered parts connected by an oblique segment. Corresponding to this profile, the image $i_m$ on the mirror, which is projected on the center of the screen, is an image having the form of a cut-off. In the same way, certain facets such as 222 and 232 are provided with a cover (222a, 232a) (as seen in FIG. 1a) to limit the useful total reflection surface of the facets according to the same cut-off profile, in such a way that the images $i_2$ and $i_3$ corresponding to the facets 222 and 232 are superimposed according to a cut-off image. The axes of the lenses 312 and 342 are slightly displaced in translation with reference to the axis E so as to create images $i_1$ and $i_4$ which are offset respectively on the left and on the right towards the roadsides $B_d$ and $B_g$ as shown in FIG. 2. The image $i_f$ is located relative to the others as shown.

The above example shows the production of a cut-off beam using the headlamp structure shown in FIGS. 1a and 1b. The cut-off is obtained by the cut-off profile of the mirror 260 and the total reflection facets 222 and 232. Naturally, the cut-off of the beams from these facets could be obtained, not by the covers such and 222a and 232a arranged on the facets themselves, but by corresponding covers arranged on the front face 202 of the bar 200. In another variation, the facets 222 and 232 could be indented in a way corresponding to the zone of the covers.

In all the foregoing it is assumed that the facets 212, 222, 232, 242, . . . operate in total reflection for a mean angle of incidence of 45°. It is clear that a certain proportion of the flux might escape total reflection and would then not be emitted by the headlamp. In order to remedy this drawback, two solutions are possible.

Firstly, a reflective coating can be arranged on the facets in such a way that all of the flux is reflected. However, it is clear that the reflective coating itself might absorb a proportion of the recovered flux. Secondly, the effectiveness of the total reflection might be increased by modifying the index of the bar and also modifying the angle of incidence.

FIGS. 3a, 3b, 3c illustrate such modifications. In these figures various values are shown for the refractive index n and for the angles relative to the reflecting facet f, which remains vertical but varies in its inclination with reference to the direction E.

In the figures, the luminous flux which is not reflected in total reflection is shown in chain lines. It will be seen that the optimum is achieved in the conditions of FIG. 3c, for a refractive index of the bar 200 of 1.7 and an angle of the facet f of 53° with reference to the direction E (37° with reference to the bar 200).

If the facets f are oriented other than at 45°, it would naturally be necessary to modify the inclination of the bar 200 so that the axis of the elementary beams reflected by the facets f still coincides with the direction of illumination E. Such a solution is particularly advantageous when the headlamp is to have an inclined glass, in which case, the glass consists of stepped lenses co-operating with different facets as stated above.

Obviously, numerous modifications and variations of the present invention are possible in the light of the above teachings. It is therefore to be understood that within the scope of the appended claims, the invention may be practiced otherwise than as specifically described herein.

I claim:

1. A light transmitting system for an automobile headlamp comprising a real light source, a light channel, means for concentrating flux from said source onto one end of said light channel, and a series of lenses, said light channel being formed by a single transparent bar arranged horizontally and transversely with reference to the direction of illumination, the front of said bar being formed by a vertical light output face and the rear of said bar having a series of vertical shape defining a series of oblique vertical reflecting facets constituting as many virtual light sources and being arranged in optical co-operation with said lenses, said lenses having axes which are parallel to the direction of illumination so that said lenses project images corresponding to said facets in said direction of illumination in order to form an assembly of elementary light beams merging into one single beam.

2. A light transmitting system according to claim 1 wherein said bar has the general shape of a rectangular parallelepiped with a succession of regular steps of substantially equal height, and said facets are substantially oriented at 45° with reference to said direction of illumination and are of substantially equal dimensions.

3. A light transmitting system according to claim 2 including a further lens and wherein said means for concentrating the flux incorporates an elliptical reflector which is provided with an aperture in the direction of illumination for direct illumination, co-operating with said further lens for the formation of an elementary direct illumination beam.

4. A light transmitting system according to claim 3 further including a second further lens and a plane mirror located in front of said input and of said bar, said plane mirror being arranged in a vertical plane substantially inclined at 45° and extending over a limited height near the axis of said bar and co-operating with said second further lens in order to create a concentrated elementary beam.

5. A light transmitting system according to claim 4 adapted to produce a cut-off beam, further including covers arranged in the path of certain elementary beams of at least certain of said facets, said covers being located in a position selected from the group comprising on said certain facets and on said front face of the said bar.

6. A light transmitting system according to claim 5, adapted to produce a cut-off beam, wherein said plane mirror in front of said bar has a silhouette corresponding to the desired cut-off shape.

7. A light transmitting system according to claim 6 adapted to produce a cut-off beam wherein at least certain of said facets have a profile corresponding to the desired cut-off shape.

8. A light transmitting system according to claim 7 wherein at least certain of said facets at least have an inclination slightly greater than 45° with reference to the direction of illumination.

* * * * *